Oct. 11, 1932. B. S. KATZ 1,881,655
TIRE
Filed Jan. 22, 1931
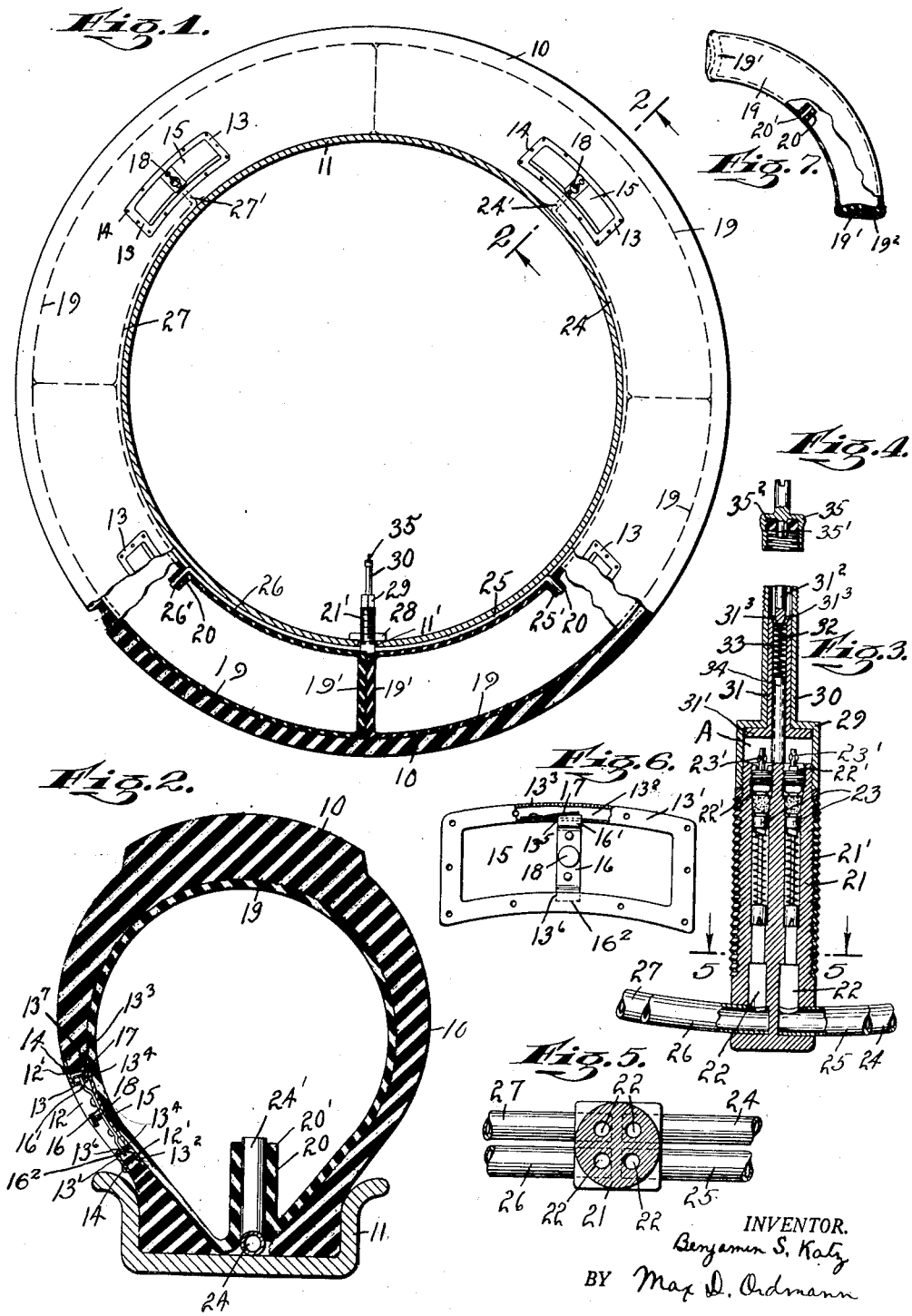
INVENTOR.
Benjamin S. Katz
BY Max D. Ordmann
ATTORNEY Patented Oct. 11, 1932

1,881,655

UNITED STATES PATENT OFFICE

BENJAMIN S. KATZ, OF BROOKLYN, NEW YORK

TIRE

Application filed January 22, 1931. Serial No. 510,368.

The present invention relates to pneumatic tires.

One of the main objects of my invention is to provide a novel tire and inner tube structure which will facilitate the repair of a flat tire without the necessity of removing the tire from the wheel of the vehicle.

A second object of my invention is to provide a novel simple construction to accomplish said first named object with the minimum consummation of time and energy.

A third object is to provide a tire having a plurality of inner tube sections each of the latter being independent of all the others so that a puncture in one will not deflate the rest of said sections.

Still another object is to provide a novel sectional inner tube structure which will thereby avoid the necessity of special ribbing in the tire proper.

A further object is to provide a novel air distributing system for inflating the inner tube sections from a common point and securing uniform pressure in said inflated sections.

Yet another object is to provide means whereby the air in inflated inner tube sections may be employed to inflate a substitute section which replaces a punctured one.

With the above and other objects in view as will be apparent from the following specification, my invention comprises the novel combination, construction and arrangement of elements to be hereinafter more fully described, shown and defined in the appended claims.

In the accompanying drawing which forms part of this specification and in which similar reference characters denote corresponding parts:—

Fig. 1 is a side elevation partially in section of a tire in accordance with my invention mounted on a common removable wheel rim;

Fig. 2 is an enlarged section along line 2—2 of Fig. 1 seen in the direction of the arrows;

Fig. 3 is a detailed sectional elevation of my novel air distributing system;

Fig. 4 is a sectional elevation of a cap control for said distributing system;

Fig. 5 is a full section along line 5—5 of Fig. 3 also seen in the direction of the arrows;

Fig. 6 is an enlarged elevation partially in section of the window frame which is to be applied to the tire; and Fig. 7 is a partial sectional view of one of the inner tube sections showing constructional details thereof.

The tire 10 may be of any type adapted in well known manner to be mounted on a removable rim 11 of a vehicle wheel (not shown). At convenient places along the front side wall of said tire openings 12 are cut, the number thereof depending upon the number of inner tube units to be employed and shown in the present instant as four in number. Each opening has mounted therein a frame 13 which has a U-shaped groove along its perimeter into which the edges 12' of said opening extend. The outer edges of said frame are bent over laterally at $13^3$ and serrated to form teeth $13^7$ which are adapted to firmly grip the wall of said tire. For convenience of mounting said frame may comprise two half sections 13' and $13^2$ which may be bolted or riveted together as at 14.

The inner face of section $13^2$ of said frame has a set back $13^4$ in which a cover plate 15 is adapted to rest. The set back being so admeasured that the inner surface of said plate is even with the inner surface of said section $13^2$. Said plate is so admeasured as to close the opening when mounted in said set back. To retain said plate in place a latch 16 is mounted to said plate and the ends 16' and $16^2$ are respectively adapted to engage in slots $13^5$ and $13^6$ respectively in said frame. A flat spring 17 or other suitable means mounted above slot $13^5$ to said frame is adapted to bear against end 16' and prevent said plate from coming loose. The latch has a suitable manipulating handle 18. This window type of entry into the tire is preferable though, I of course, may employ other means of entry into said tire if desired.

In the present embodiment I show four inner tube sections 19 each of which is in shape of a quadrant of a circle. The said tube sections 19 is made of rubber of the same quality and kind as now commonly employed. The ends 19' of said sections however, are thickened and if desired may be reinforced by suitable material 19² such as rubberized fabric or the like as shown in Fig. 7. The said ends are concave in shape. The reason for thickening said ends and reinforcing them is for the purpose of preventing the said ends adjacent a deflated tube section from blowing out. The reason for concaving the ends of said sections is that when adjacent tube sections are mounted in said tire, and inflated, the abutting ends 19' form as nearly as is possible the straight side walls, as shown in Fig. 1, and leave no gap at their adjacent peripheries at which the tire remains uninflated. With said concave ends, the peripheral ends of said extremities are caused to closely approach each other and the diameter at said ends is the same as at the centre of said tube sections, when the said sections are completely inflated.

Each section is provided with a valve in form of a neck 20 extending inwardly from the wall of said section and made of the same material and integrally formed with or attached in leak-proof manner to said section and having a lumen 20' therein. Said neck may be located centrally along the inner arc of said section.

The dimensions of said openings 12 are so admeasured as to permit a tube section to be freely inserted into the tire therethrough.

The inflating system employed by me to secure uniform pressure in all the tube sections comprises a valve body or stem 21 having therein four longitudinally bored holes 22 which in their upper ends 22' are threaded and have set therein one way valves 23 of well known construction which permit air to pass downwardly through said holes, but cut off air flow in the opposite direction. The upper ends of the valve control rods 23' of said valves 23 project above the top surface of stem 21. Suitably mounted in said stem 21 and respectively communicating with each one of the holes 22 preferably at its bottom are four pipes 24, 25, 26 and 27 whose free ends are bent laterally as at 24', 25', 26' and 27' to form stems on which the necks 20 of said tube sections may be mounted. The diameters of said pipe stems are slightly greater than lumens 20' to insure a tight fit. The length of the respective pipes may be so admeasured that one of the said pipe stems is located opposite each one of the openings in the tire. The said pipes, of course, are circularly curved to conform to the contour of the rim 11, and the stem 21 is adapted to pass through the usual opening 11' therein and be secured in place by a nut 28 engaging a threaded portion 21' of said stem.

The stem 21 is provided with a cap 29 which may threadedly engage it. The top of said cap is spaced from the top of said stem to form therebetween an air chamber A. Formed with said top is a tubular prolongation 30. Slidably mounted in said chamber A and in said tubular prolongation 30 is a plunger 31 whose lower end is widened as at 31' and whose upper end is reduced in section as at 31². The said plunger has hole 32 therein and communicating passageways 31³ to the shoulder surrounding the reduced portion 31². A spring 33 lies in said hole 32 and a tubular rod 34 is adapted to be inserted into said hole below said spring. Said rod does not seal the passageway 32 and air may flow therethrough. Thus when the cap 29 is mounted to stem 21, the plunger 31 is kept normally out of engagement with the valve rods 23' by reason of spring 33 and rod 34.

A cap 35 may be provided to cover the top of the tubular prolongation 30 and may threadedly engage the latter or in any other way. Said cap interiorly is provided with a downwardly projecting pin member 35' which when said cap is mounted to said prolongation, engages the upper end 31² of said plunger and depresses the latter, causing the lower end 31' to depress the valve rods 23' and open the valves 23 to air chamber A. Suitable packing 35² in said cap 35 prevents leakage of air when it is mounted on said prolongation 30.

In operation a tube section is inserted through each of the respective windows and its respective neck mounted on the respective pipe stem. Then the windows are closed. The cap 35 is removed and a pump line attached to said tubular prolongation 30 and air pumped into chamber A from whence it distributes itself through the valves 23 and pipes 24, 25, 26 and 27 to the respective tube sections, which are inflated to required pressure and which latter assume the shape shown in Figs. 1 and 2. Since pipes 24, 25, 26 and 27 all communicate with the common chamber A through their respective valves 23 and the latter are all alike, the pressure in each of the tube sections is substantially equal. Since each of the pipes 24, 25, 26 and 27 is controlled by a separate valve 23 however, if one of the sections should become punctured, it will not affect the other sections unless the valves 23 are opened. The latter open only to permit entry of air to said sections and automatically closed to prevent air from escaping from the respective sections.

Should one of the sections become punctured, the driver opens the window opposite the deflated section, removes the latter and inserts an undamaged section mounting its neck 20 on the respective free pipe stem, closes the window and then places the cap 35 over the end of prolongation 30 causing the pin 35' to depress the plunger 31 and open all the valves 23 so that air from the other sections may escape into chamber A and enter the uninflated section. When the pressure has been equalized thus in all the sections, the cap is removed. The pressure of course, in all is less than that initially but sufficient to permit the driver to operate his vehicle and drive it to the nearest pumping station where the sections may be again inflated to full pressure. Of course, if a pump is available at the scene of the puncture, the same may be directly applied to the prolongation 31 and air pumped into the deflated replacement section. It is to be noted that directly pumping air into the deflated section through stem 30 without first distributing the air in the inflated sections by means of cap 35 will not be harmful. This is so because, when air is pumped through prolongation 30, the plunger 31 moves downward depressing the stems 23' of the valves 23 and causing automatic redistribution during the pumping operation so that the pressure in all sections is equalized.

My device of course, may be modified in many ways and I do not wish to be limited to the details shown and described.

What I claim is:

1. In a tire having removable inner tube sections, means to inflate said tube sections from a common point, said means comprising pipes corresponding in number to the number of tube sections adapted to be connected thereto, and all terminating in a common chamber, a one way valve in each pipe at its terminal in the said common chamber, a closure member for said chamber having an inlet to the latter and plunger means slidably mounted in said closure member, the former adapted when moved inwardly to simultaneously open all of said valves.

2. In a tire having individually removable inner tube sections, means to inflate said tube sections from a common point, said means comprising pipes corresponding in number to the number of tube sections and all terminating in a common chamber, a one way valve in each pipe at its terminal in the said common chamber, a tubular prolongation serving as an inlet to said chamber, a plunger slidably mounted in said prolongation, said plunger when moved inwardly being adapted to simultaneously open all of said valves.

3. A tire having removable inner tube sections, means to inflate said tube sections from a common point, said means comprising pipes corresponding in number to the number of tube sections and respectively so admeasured in length as to terminate one opposite each tube section and being laterally bent over at said terminals to be connected to said tube sections, a stem having a plurality of passageways, corresponding in number to the number of pies and to which the respective pipes are attached, a common chamber in said stem in which all said passageways terminate, a one way valve mounted in each of said passageways at its terminal in said common chamber, a closure member for said chamber having a tubular prolongation serving as an inlet thereto, a plunger member slidably mounted in said tubular prolongation which when moved inwardly is adapted to release all said valves simultaneously, and means to so move said plunger and seal said inlet to said chamber while so doing.

4. In a tire having removable inner tube sections, means to inflate said tube sections from a common point, said means comprising pipes corresponding in number to the number of tube sections and all terminating in a common chamber, a one way valve in each pipe at its terminal in the said common chamber, a closure member for said chamber having an inlet to the latter, plunger means slidably mounted in said closure member, the former adapted when moved inwardly to simultaneously open all of said valves and means to so move said plunger means and seal said inlet when so doing.

In testimony whereof I affix my signature.

BENJAMIN S. KATZ.